(12) United States Patent
Lin et al.

(10) Patent No.: US 11,994,658 B2
(45) Date of Patent: May 28, 2024

(54) PROJECTOR

(71) Applicant: QISDA CORPORATION, Taoyuan (TW)

(72) Inventors: Ming-Kuen Lin, Taoyuan (TW); Chih-Shiung Chien, Taoyuan (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 637 days.

(21) Appl. No.: 17/153,898

(22) Filed: Jan. 21, 2021

(65) Prior Publication Data
US 2021/0255441 A1 Aug. 19, 2021

(30) Foreign Application Priority Data
Feb. 15, 2020 (TW) .................................. 109104843

(51) Int. Cl.
*G02B 13/16* (2006.01)
*G02B 13/22* (2006.01)
*G03B 21/28* (2006.01)
*G03B 21/54* (2006.01)
*H04N 5/74* (2006.01)

(52) U.S. Cl.
CPC ............. *G02B 13/16* (2013.01); *G02B 13/22* (2013.01); *G03B 21/28* (2013.01); *G03B 21/54* (2013.01); *H04N 5/7458* (2013.01)

(58) Field of Classification Search
CPC ........ G02B 26/08; G02B 21/00; G02B 13/16; G02B 13/22; G02B 13/10; G03B 21/00; G03B 21/54
See application file for complete search history.

(56) References Cited

U.S. PATENT DOCUMENTS

| | | | | |
|---|---|---|---|---|
| 5,241,407 A | * | 8/1993 | Sonehara | G02B 27/145 349/8 |
| 2009/0262311 A1 | * | 10/2009 | Lin | G02B 17/045 353/81 |
| 2014/0340650 A1 | * | 11/2014 | Davis | H04N 9/3105 353/121 |
| 2014/0347634 A1 | * | 11/2014 | Bommerbach | G03B 33/14 353/121 |

FOREIGN PATENT DOCUMENTS

| TW | 200928555 A | 7/2009 |
|---|---|---|
| TW | 201932967 A | 8/2019 |

\* cited by examiner

*Primary Examiner* — Christopher Stanford
*Assistant Examiner* — Journey F Sumlar (57) ABSTRACT

A projector includes a lens, a beam processing module, a plurality of digital micromirror devices, a reflecting module and an illumination module. The beam processing module is disposed with respect to the lens. The digital micromirror devices are disposed around the beam processing module, wherein a beam projecting path is defined between the lens and the digital micromirror device. The reflecting module is disposed with respect to the digital micromirror devices and located beyond the beam projecting path. The illumination module is disposed with respect to the reflecting module. An initial beam projected by the illumination module is reflected to the digital micromirror devices by the reflecting module, such that the digital micromirror devices generate a plurality of image beams. The beam processing module combines the image beams to form a projecting beam and projects the projecting beam onto the lens along the beam projecting path.

7 Claims, 6 Drawing Sheets

PROJECTOR

BACKGROUND OF THE INVENTION

1. Field of the Invention

The present invention relates to a projector, and more particularly, to a projector utilizing a short back focus lens for projection.

2. Description of the Prior Art

With the advanced technology, the projector can not only apply to the conference in the office, but also the seminar or the course in the campus due to its audiovisual function. Generally, the projector can be the liquid crystal display (LCD) projector or the digital light processing (DLP) projector. The DLP projector has features of high contrast, small dimension and preferred sharpness, and is more popular with a market demand. The DLP projector utilizes the digital micromirror device to be an imaging module, and the illumination beam is projected onto the digital micromirror device via the specific incident angle. The conventional DLP projector has several digital micromirror devices, and therefore has to cooperate with the lens having a long back focus, such as the back focus being greater than 60 millimeter; however, the lens having the long back focus has drawbacks of expensive cost and large dimension, and the manufacturing cost and the product volume of the conventional DLP projector with several digital micromirror devices are increased accordingly. Thus, design of the DLP projector having the digital micromirror devices and the short back focus lens (such as being smaller than 40 millimeter) is an important issue in the mechanical design industry.

SUMMARY OF THE INVENTION

The present invention provides a projector utilizing a short back focus lens for projection for solving above drawbacks.

According to the claimed invention, a projector include a lens, a beam processing module, a plurality of digital micromirror devices, a reflecting module and an illumination module. The beam processing module is disposed relative to the lens. The plurality of digital micromirror devices is disposed around the beam processing module, and a beam projecting path is defined between the lens and at least one digital micromirror device. The reflecting module is disposed relative to the plurality of digital micromirror devices and located beyond the beam projecting path. The illumination module is disposed relative to the reflecting module. An initial beam projected by the illumination module is reflected to the plurality of digital micromirror devices by the reflecting module, so that the plurality of digital micromirror devices generates a plurality of image beams, and the beam processing module combines the plurality of image beams to form a projecting beam and projects the projecting beam onto the lens along the beam projecting path.

The present invention can dispose the reflecting module beyond the beam projecting path between the lens and one digital micromirror device. The reflecting module is not overlapped with the beam projecting path, so that the beam transmitted along the beam projecting path does not pass through the reflecting module. Because the reflecting module is located beyond the beam projecting path, the projector having the plurality of digital micromirror devices can use the short back focus lens (such as being smaller than forth millimeter) to project the images, so as to decrease the manufacturing cost and the product volume of the projector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
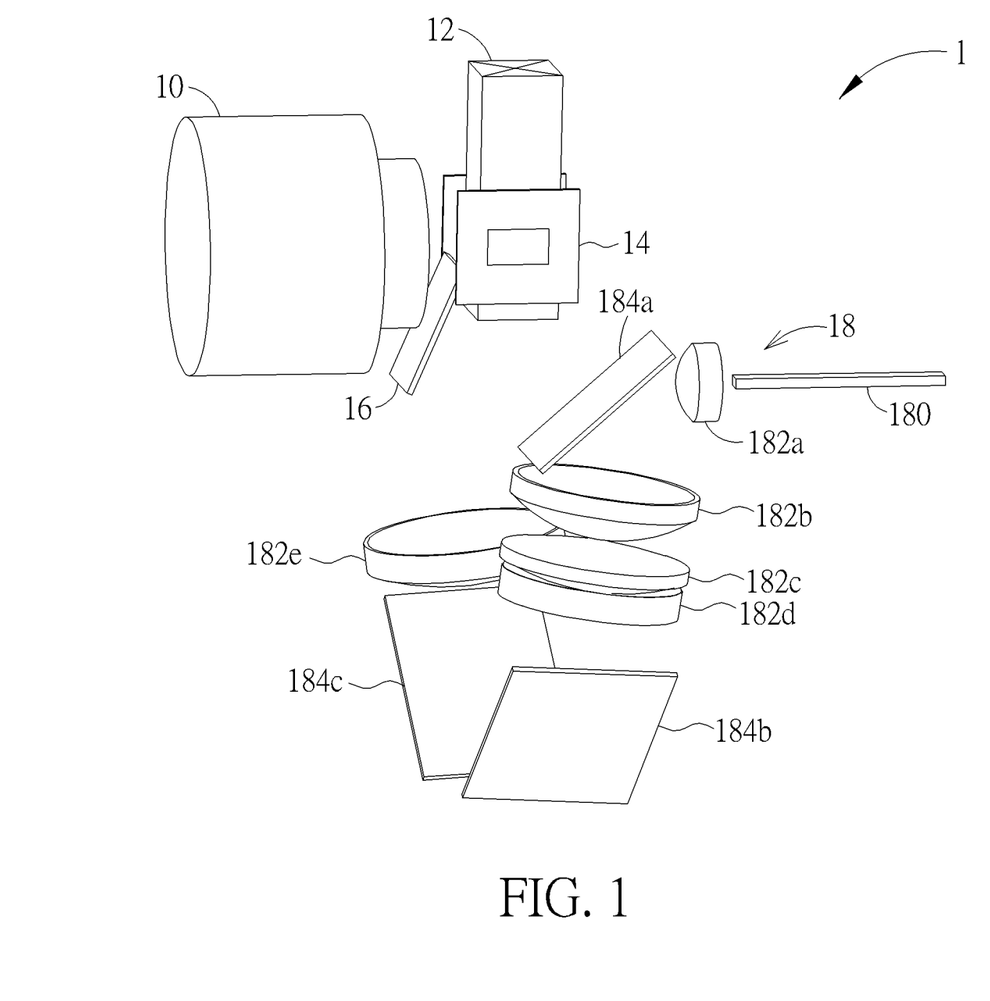
FIG. 1 is a schematic diagram of a projector according to an embodiment of the present invention.
Figure 2:
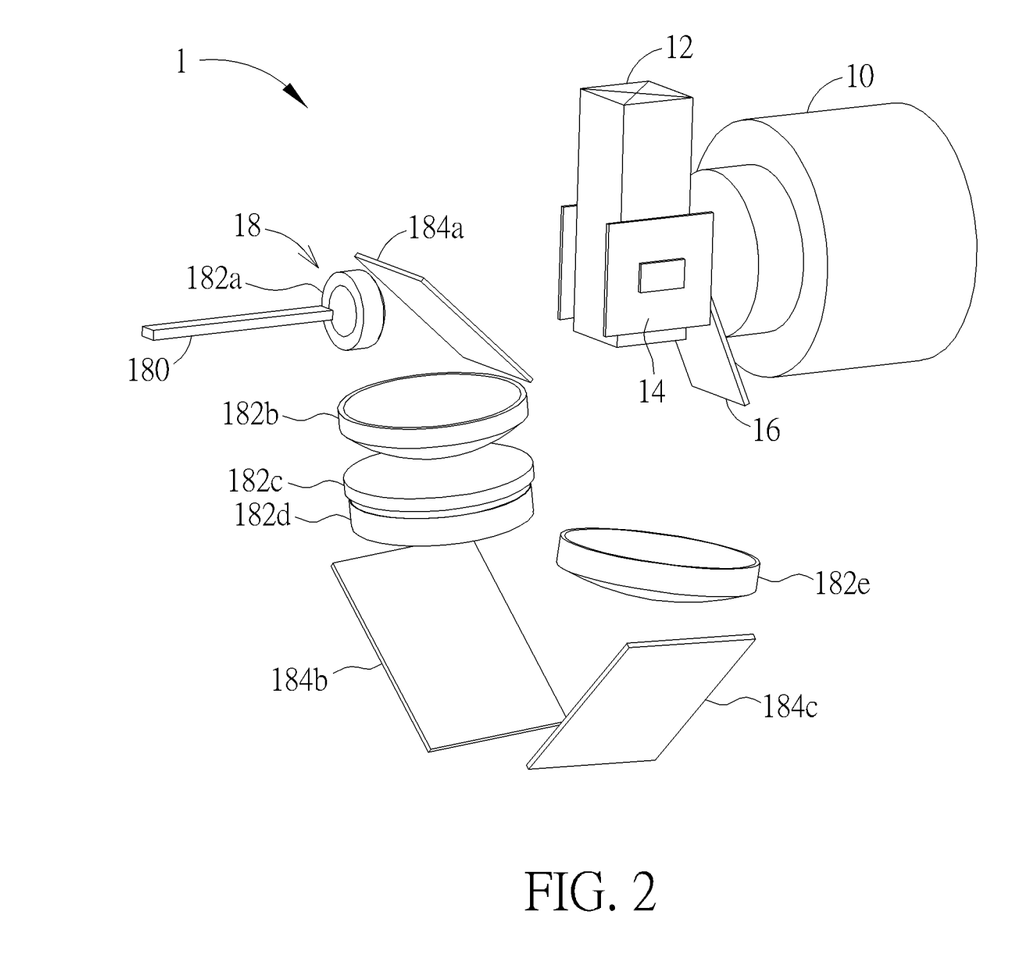
FIG. 2 is a schematic diagram of the projector in another view according to the embodiment of the present invention.
Figure 3:
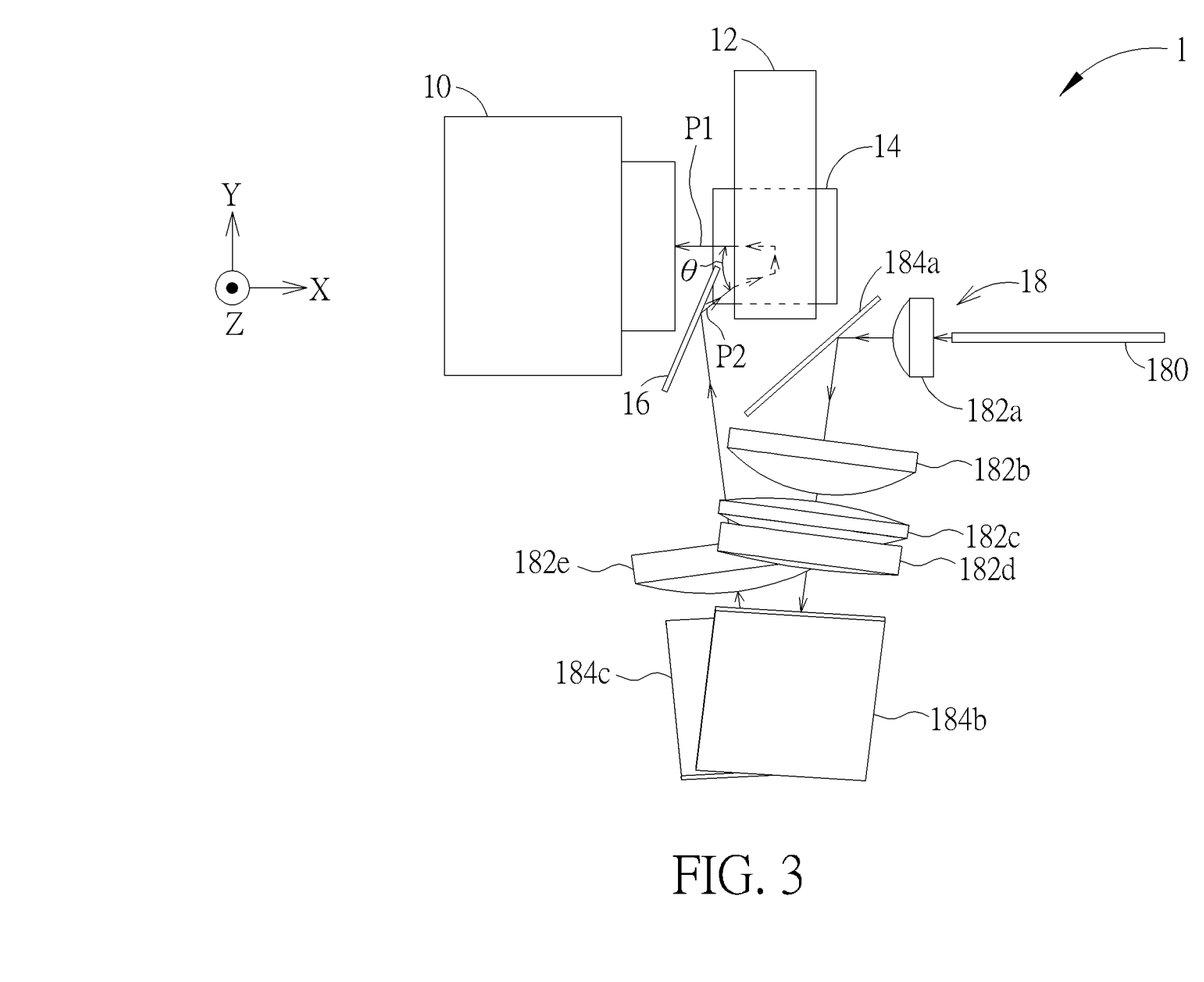
FIG. 3 is a side view of the projector according to the embodiment of the present invention.

Please refer to FIG. 1 to FIG. 3. FIG. 1 is a schematic diagram of a projector 1 according to an embodiment of the present invention. FIG. 2 is a schematic diagram of the projector 1 in another view according to the embodiment of the present invention. FIG. 3 is a side view of the projector 1 according to the embodiment of the present invention. It should be mentioned that only one digital micromirror device 14 disposed on a side of a beam processing module 12 is shown in FIG. 3 for convenient illustration.

As shown in FIG. 1 to FIG. 3, the projector 1 can include a lens 10, the beam processing module 12, a plurality of digital micromirror devices 14, a reflecting module 16 and an illumination module 18. In an actual application, the projector 1 may include a casing (which is not shown in the figures) for accommodating the lens 10, the beam processing module 12, the plurality of digital micromirror devices 14, the reflecting module 16 and the illumination module 18. Besides, the casing of the projector 1 may accommodate some software and hardware, such as a controller, a circuit board, a memory, a light source, a power supply, an application program and a communication module, which depend on an actual demand.

The beam processing module 12 can be disposed relative to the lens 10. In the embodiment, the beam processing module 12 can be the X-cube prism or any other similar component.

The plurality of digital micromirror devices 14 can be disposed around the beam processing module 12. A beam projecting path P1 can be defined between the lens 10 and the digital micromirror devices 14, as shown in FIG. 3. In the embodiment, the projector 1 can have two digital micromirror devices 14, which are respectively disposed on two opposite sides of the beam processing module 12.

The reflecting module 16 can be disposed relative to the plurality of digital micromirror devices 14, and located beyond the beam projecting path P1; that is to say, the reflecting module 16 is not overlapped with the beam projecting path P1. Therefore, a beam along the beam projecting path P1 does not pass through the reflecting module 16. In the embodiment, the reflecting module 16 can be a mirror, such as the fold mirror, which depends on a design demand. In other possible embodiment, the reflecting module 16 can be a prism, such as the total internal reflection (TIR) prism. In the present invention, the beam processing module 12 can provide a beam splitting and combining function, so that one prism or one mirror can be used as the reflecting module 16.

The illumination module 18 can be disposed relative to the reflecting module 16. In the embodiment, the illumination module 18 can include a light pipe 180, a plurality of optical components 182a-182e, and a plurality of reflectors 184a-184c. It should be mentioned that a combination and arrangement of the illumination module 18 can be varied according to the actual demand, and not limited to the embodiment of the present invention. In the actual application, the projector 1 may further have a light source (which is not shown in the figures) used to emit a beam toward the light pipe 180. Then, the beam can pass through the light pipe 180, the optical component 182a, the reflector 184a, the optical components 182b-182d, the reflectors 184b-184c and the optical component 182e to form an initial beam. In the embodiment, the optical component 182e can be interpreted as a light emitting portion of the illumination module 18, and the optical component 182e can be disposed relative to the reflecting module 16, so that the optical component 182e can project the initial beam onto the reflecting module 16.

Then, the initial beam projected by the optical component 182e of the illumination module 18 can be reflected to the plurality of digital micromirror devices 14 by the reflecting module 16, and therefore the plurality of digital micromirror devices 14 can generate a plurality of image beams. In the embodiment, the beam processing module 12 can provide the beam splitting and combining function, so that the initial beam (such as a white beam) projected from the optical component 182e of the illumination module 18 can be reflected to the beam processing module 12 by the reflecting module 16, and then the beam processing module 12 can divide the initial beam into a plurality of medium beams (such as a red beam, a green beam and a blue beam) and reflect the plurality of medium beams to the plurality of digital micromirror devices 14. Then, the plurality of digital micromirror devices 14 can reflect the plurality of medium beams to generate a plurality of image beams (such as a red image beam, a green image beam and a blue image beam), and the plurality of image beams can be reflected to the beam processing module 12 along the beam projecting path P1.

In the embodiment, the projector 1 can include two digital micromirror devices 14; therefore, the beam processing module 12 can have two dichroic filters, which are perpendicular to each other, used to turn the red beam (which means the medium beam) and the green beam (which means the medium beam) to ninety degrees and reflect the red beam and the green beam respectively toward the corresponding digital micromirror device 14, and further used to turn the blue beam (which means the medium beam) to ninety degrees and reflect the blue beam to one of the digital micromirror devices 14. In other possible embodiment, the projector 1 may include three digital micromirror devices 14, which mean a third digital micromirror device 14 can be disposed on a side of the beam processing module 12 relative to the lens 10; in this situation, the beam processing module 12 can utilize the two dichroic filters to turn the red beam (which means the medium beam) and the green beam (which means the medium beam) to ninety degrees and respectively reflect the red beam and the green beam to the corresponding digital micromirror device 14, and further to allow passing of the blue beam (which means the medium beam) and then transmit the blue beam to the third digital micromirror device 14, so that the three digital micromirror devices 14 can generate the red image beam, the green image beam and the blue image beam.

The beam processing module 12 can combine the plurality of image beams into a projecting beam (such as a full color image beam), and the projecting beam can be projected onto the lens 10 along the beam projecting path P1. Because the reflecting module 16 is located beyond the beam projecting path P1, the projector 1 having the plurality of digital micromirror devices 14 can be cooperated with the short back focus lens 10 (for example, the short back focus may be smaller than forty millimeter) to project the images, and manufacturing cost and product volume of the projector 1 can be decreased effectively.

In addition, a beam emitting path P2 can be defined between the reflecting module 16 and the digital micromirror device 14. The foresaid initial beam can be projected onto the beam processing module 12 along the beam emitting path P2, and divided into the plurality of medium beams by the beam processing module 12. Then, the foresaid medium beams can be projected onto the digital micromirror device 14 along the beam emitting path P2. When an angle between the beam projecting path P1 and the beam emitting path P2 is smaller than twenty degrees, the reflecting module path P2 may be easily interfered with the beam projecting path P1 and/or other components. Therefore, in the embodiment, the angle between the beam projecting path P1 and the beam emitting path P2 can be greater than or equal to twenty degrees, to avoid interference between the reflecting module 16 and the beam projecting path P1 and/or other components. Besides, when the angle between the beam projecting path P1 and the beam emitting path P2 is greater than forth degrees, a diameter of the lens 10 has to be enlarged and a structural height of the projector 1 is increased accordingly. In the embodiment, the angle between the beam projecting path P1 and the beam emitting path P2 can be smaller than or equal to forty degrees, to avoid the structural height of the projector 1 from over-increasing.

In the embodiment of the present invention, a thickness of the beam processing module 12 can be ranged between 20 millimeter and 30 millimeter; it should be mentioned that the thickness of the beam processing module 12 can be designed in accordance with a dimension of the digital micromirror device 14 and an f-number of the lens 10.

Figure 4:
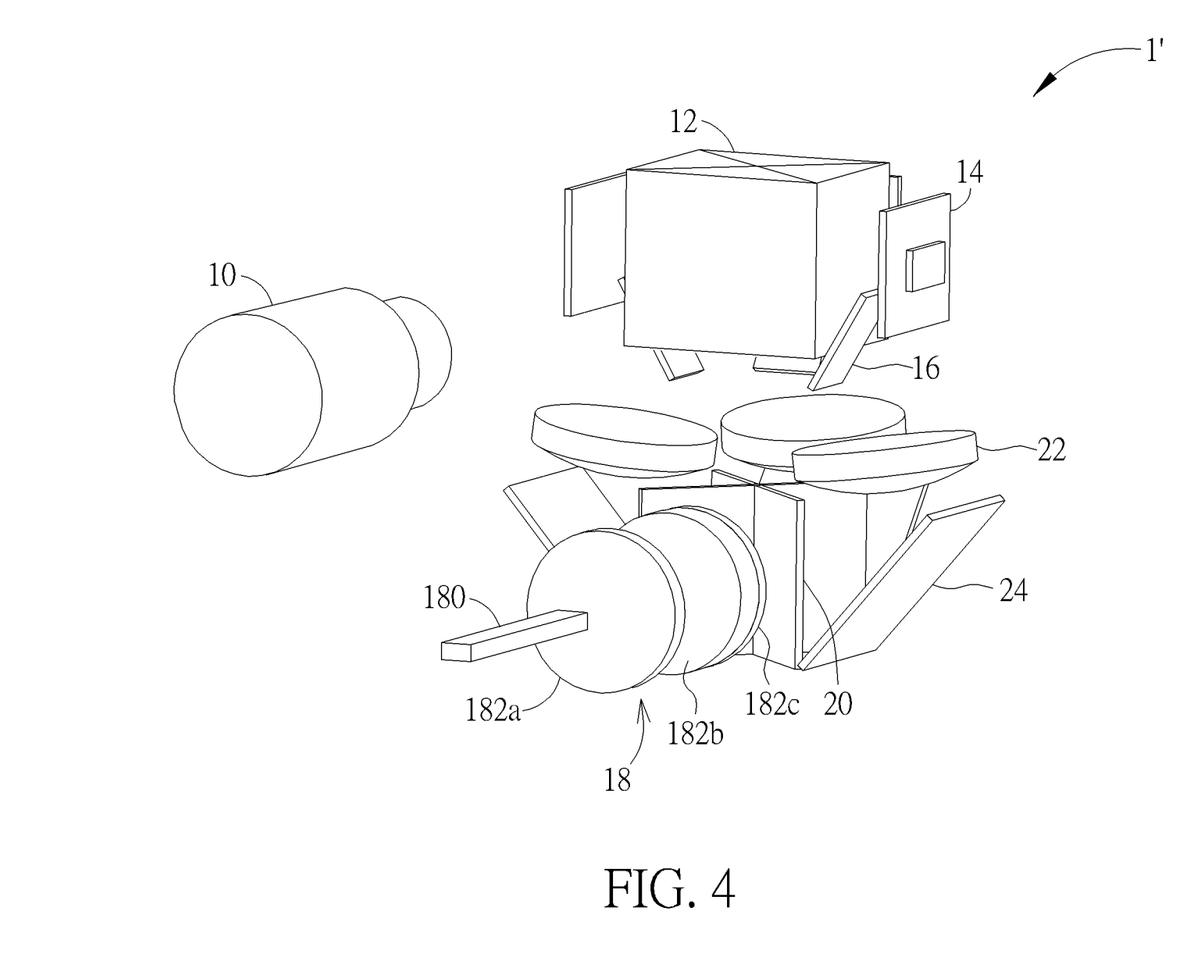
FIG. 4 is a schematic diagram of the projector according to another embodiment of the present invention.
Figure 5:
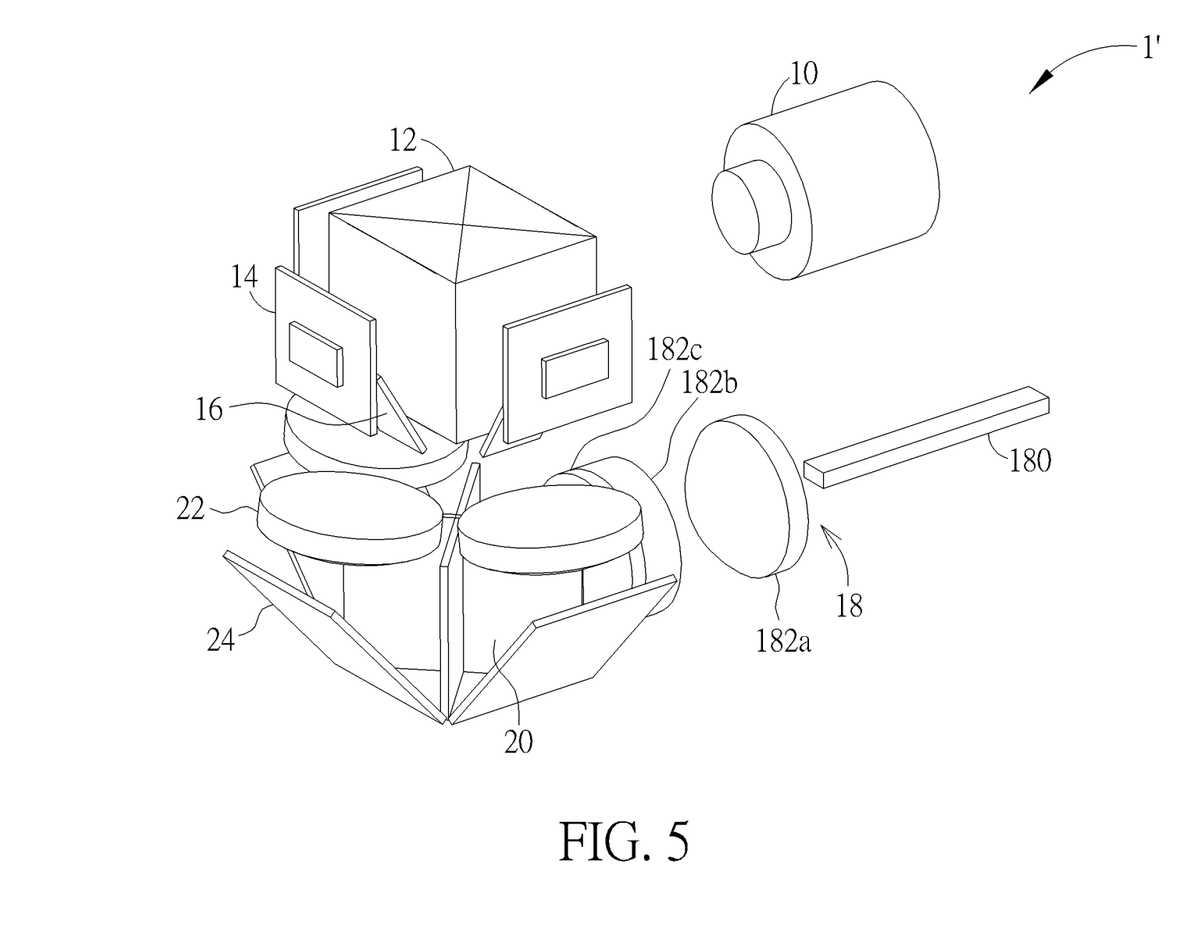
FIG. 5 is a schematic diagram of the projector in another view according to another embodiment of the present invention.
Figure 6:
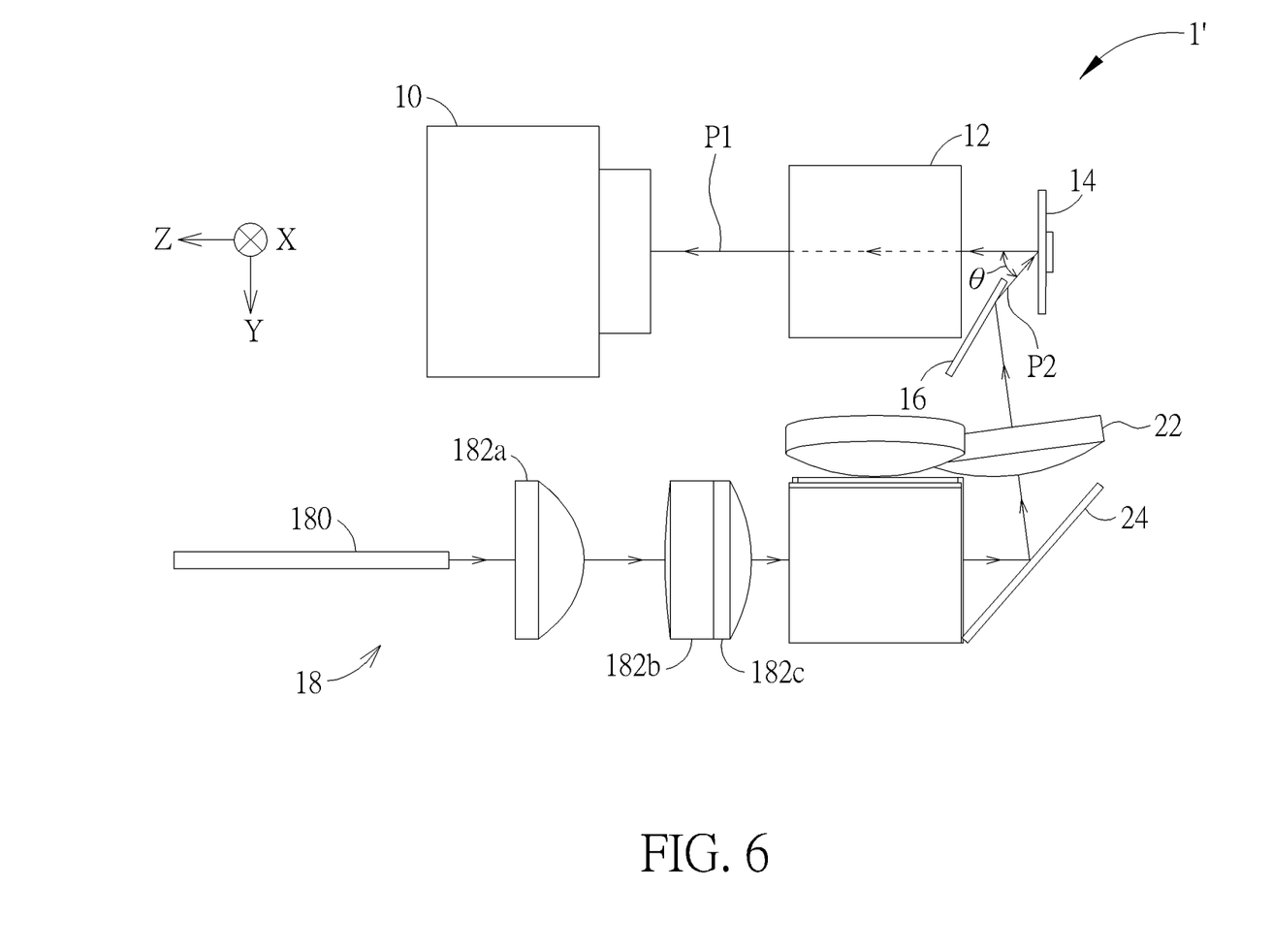
FIG. 6 is a side view of the projector according to another embodiment of the present invention.

Please refer to FIG. 4 to FIG. 6. FIG. 4 is a schematic diagram of the projector 1' according to another embodiment of the present invention. FIG. 5 is a schematic diagram of the projector 1' in another view according to another embodiment of the present invention. FIG. 6 is a side view of the projector 1' according to another embodiment of the present invention. It should be mentioned that only one digital micromirror device 14 disposed on a side of the beam processing module 12 and relative to the lens 10 is shown in FIG. 6 for convenient illustration.

Difference between the projector 1' and the projector 1 is: the projector 1' can further include a beam splitting module 20 disposed between the reflecting module 16 and the illumination module 18, as shown in FIG. 4 and FIG. 5. In the embodiment, the beam processing module 12 can merely provide a beam combining function, and the beam splitting module 20 can provide a beam splitting function. In a preferred embodiment, the beam splitting module 20 can be, but not limited to, a X-plate beam splitter set; in other possible embodiment, the beam splitting module 20 may be a X-cube prism or any other similar component.

In addition, the projector 1' can include three digital micromirror devices 14. Because the projector 1' utilizes the beam splitting module 20 to provide the beam splitting function, the projector 1' can dispose three prisms or three mirrors relative to the three digital micromirror devices 14 as being the reflecting module 16. In the embodiment, projector 1' disposes three mirrors relative to the three digital micromirror devices 14 for being the reflecting module 16. Besides, the projector 1' can further include three optical components 22 and three mirror s 24, which are respectively disposed relative to the three digital micromirror devices 14.

Moreover, the illumination module 18 of the projector 1' can include the light pipe 180 and the plurality of optical components 182a-182c. It should be mentioned that the combination and arrangement of the illumination module 18 can be varied according to the actual demand, and not limited to the embodiment of the present invention. In the actual application, the projector 1' may further include the light source (which is not shown in the figures) used to emit the beam toward the light pipe 180. Then, the beam can pass through the light pipe 180 and the optical components 182a-182c to form the initial beam. In the embodiment, the optical component 182c can be interpreted as the light emitting portion of the illumination module 18. In the embodiment, the optical component 182c can be disposed relative to the beam splitting module 20, and the beam splitting module 20 can be disposed relative to the reflecting module 16. That is to say, the illumination module 18 can be disposed relative to the reflecting module 16 via the beam splitting module 20. Therefore, the initial beam from the optical component 182c of the illumination module 18 can be divided by the beam splitting module 20, and the divided initial beam can be projected onto the reflecting module 16 via the mirror 24 and the optical component 22.

The initial beam projected by the optical component 182c of the illumination module 18 can be divided into the plurality of medium beams (such as the red beam, the green beam and the blue beam) by the beam splitting module 20, and each medium beam can be transmitted to the reflecting module 16 by the mirror 24 and the optical component 22, and reflected to the digital micromirror devices 14 by the reflecting module 16. Then, each of the digital micromirror devices 14 can immediately reflect the medium beam to generate the image beam (such as the red image beam, the green image beam and the blue image beam), and the plurality of image beams can be projected onto the beam processing module 12 along the beam projecting path P1.

Thus, the beam processing module 12 can combine the plurality of image beams into the projecting beam (such as the full color image beam), and the projecting beam can be projected onto the lens 10 along the beam projecting path P1. Because the reflecting module 16 is located beyond the beam projecting path P1, the projector 1' having the plurality of digital micromirror devices 14 can use the short back focus lens 10 (for example, the short back focus may be smaller than forty millimeter) to project the images, and the manufacturing cost and the product volume of the projector 1' can be decreased effectively. In the embodiment shown in FIGS. 4-6, elements having the same numeral as ones of the embodiment shown in FIGS. 1-3 have the same structures and functions, and a detailed description is omitted herein for simplicity.

In conclusion, the present invention can dispose the reflecting module beyond the beam projecting path between the lens and one digital micromirror device. The reflecting module is not overlapped with the beam projecting path, so that the beam transmitted along the beam projecting path does not pass through the reflecting module. Because the reflecting module is located beyond the beam projecting path, the projector having the plurality of digital micromirror devices can use the short back focus lens (such as being smaller than forth millimeter) to project the images, so as to decrease the manufacturing cost and the product volume of the projector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
   a lens;
   a beam processing module disposed relative to the lens;
   a plurality of digital micromirror devices disposed around the beam processing module, a beam projecting path being defined between the lens and at least one digital micromirror device;
   a reflecting module disposed relative to the plurality of digital micromirror devices and located beyond the beam projecting path; and
   an illumination module disposed relative to the reflecting module;
   wherein an initial beam projected by the illumination module is reflected to the plurality of digital micromirror devices by the reflecting module, so that the plurality of digital micromirror devices generates a plurality of image beams, and the beam processing module combines the plurality of image beams to form a projecting beam and projects the projecting beam onto the lens along the beam projecting path;
   wherein a beam emitting path is defined between the reflecting module and the digital micromirror device, an angle between the beam projecting path and the beam emitting path is greater than or equal to twenty degrees.

2. The projector of claim 1, wherein the angle between the beam projecting path and the beam emitting path is smaller than or equal to forty degrees.

3. The projector of claim 1, wherein the reflecting module comprises at least one prism or at least one mirror.

4. The projector of claim 1, wherein the initial beam projected by the illumination module is reflected to the beam processing module by the reflecting module, the beam processing module divides the initial beam into a plurality of medium beams and reflects the plurality of medium beams to the plurality of digital micromirror devices, the plurality of digital micromirror devices reflects the plurality of medium beams to generate the plurality of image beams.

5. The projector of claim 1, further comprising:
   a beam splitting module disposed between the reflecting module and the illumination module;
   wherein the initial beam projected by the illumination module is divided into a plurality of medium beams by the beam splitting module, the plurality of medium beams is reflected to the plurality of digital micromirror devices by the reflecting module, the plurality of digital micromirror devices reflects the plurality of medium beams to generate the plurality of image beams.

6. The projector of claim 1, wherein two digital micromirror devices of the plurality of digital micromirror devices are disposed on two opposite sides of the beam processing module.

7. The projector of claim 1, wherein a thickness of the beam processing module is ranged between 20 millimeter and 30 millimeter.

\* \* \* \* \*